Jan. 16, 1923.
H. N. ATWOOD.
MOTOR CYCLE WHEEL STRUCTURE.
FILED DEC. 10, 1921.
1,442,242.
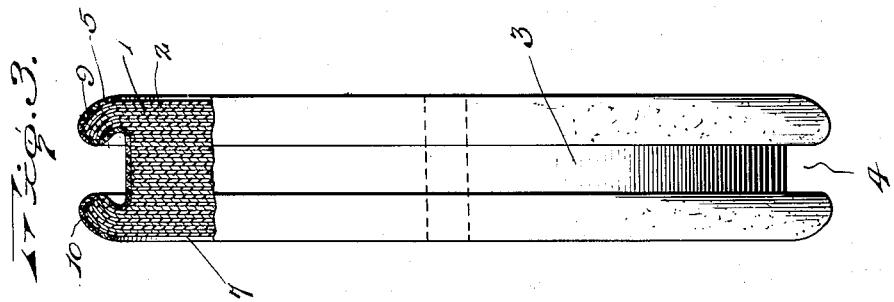
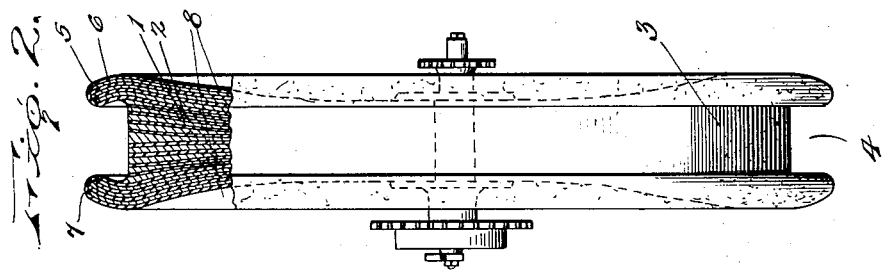
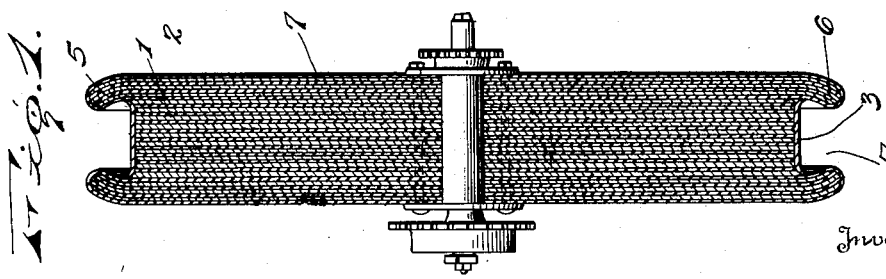
Inventor
H. N. Atwood.
By Lacey & Lacey, Attorneys Patented Jan. 16, 1923.

1,442,242

UNITED STATES PATENT OFFICE.

HARRY N. ATWOOD, OF SMITHFIELD, NORTH CAROLINA, ASSIGNOR TO RUBWOOD, INC., OF LAWRENCE, MASSACHUSETTS, A CORPORATION OF MASSACHUSETTS.

MOTOR-CYCLE-WHEEL STRUCTURE.

Application filed December 10, 1921. Serial No. 521,371.

*To all whom it may concern:*

Be it known that I, HARRY N. ATWOOD, a citizen of the United States, residing at Smithfield, in the county of Johnston and State of North Carolina, have invented certain new and useful Improvements in Motor-Cycle-Wheel Structures, of which the following is a specification.

This invention relates to improvements in vehicle wheels and more particularly to an improved wheel for motor-cycles and similar vehicles.

One of the primary objects of the present invention is to provide a wheel of the type mentioned in which the body and rim constitute an integral structure adapted for the application thereto of any standard type of tire, so that it will be unnecessary to resort to the use of the usual felloe band or rim.

Another object of the invention is to provide a wheel of the type mentioned in which the body and rim constitute an integral structure made up of plies of veneer bonded together by intervening plies of rubber material, the rim being reinforced by a covering of rubber in which a reinforcing medium such for example as wire mesh material is embedded.

A further object of the invention is to provide a wheel of the type mentioned which will be especially adapted for the application thereto of the usual wheel fittings such for example as brake drums, hubs, sprockets, etc., these applicances being adapted to be installed in a more secure manner than is possible in the usual constructions of motor-cycle wheels.

In the accompanying drawings:

Figure 1 is a diametric sectional view through a motor-cycle wheel constructed in accordance with the present invention;

Figure 2 is a similar view illustrating a modification;

Figure 3 is a similar view illustrating a further modification.

The body and rim of the wheel of the present invention are preferably produced in accordance with the method disclosed in my copending application filed, Dec. 10, 1921, Serial No. 521,372, and in order that a full understanding may be had of the present invention, I will briefly describe the said method.

In the several figures of the drawings the numeral 1 indicates in general veneer plies, and the numeral 2 indicates in general intervening plies of rubber which serve to bond together the plies 1. In building up the structure the veneer plies 1 are initially cut to the required marginal dimensions and contour and while in a wet or moist state, either naturally or by artificial impregnation, they are subjected, either singly or collectively, to pressure and heat in suitable moulds or forms whereby they are given any dsired surface contour. During this step the moisture is expelled from the plies and they are thoroughly dried so that when delivered from the mould or form they will be of the required contour and will permanently maintain the same.

Having formed the several component veneer plies of the wheel body in the manner above described, these plies are assembled in the proper order to build up the wheel structure, and the rubber bonding plies 2 are interposed between them, these latter plies being preferably of uniform thickness and being of uncured or semi-cured sheet rubber. The assemblage is then subjected to heat and pressure or otherwise treated by a process of vulcanization so that the bonding plies will become intimately incorporated with the veneer plies and the assemblage will be delivered as a composite and substantially integral whole.

In preparing the veneer plies 1, certain of them which are to occupy an intermediate position in the assemblage are cut to uniform circular shape, so that their peripheries, in the assemblage, will provide the bottom or inner wall 3 of the tire receiving channel 4 of the rim of the wheel. Others of the plies which are located laterally outwardly of the said intermediate plies are likewise cut to circular form but of greater diameter than the first mentioned plies, and their peripheral portions, in the preparatory step of the method, are laterally turned or dished as indicated by the numeral 5. When the plies are all assembled in the proper manner, the portions 5 of the last mentioned plies will, in conjunction with the corresponding portions of the interposed bonding plies, form flanges 6 defining the side walls of the channel 4 and curve inwardly toward each other so as to give to the channel the proper shape to receive a clincher or other form of tire casing or tire. Thus when the several plies have been assembled and subjected to the final step of vulcanization, the product will be a wheel body having a tire seating rim integral therewith and forming a component part thereof.

Preferably the entire structure is covered with a facing sheet 7 of rubber or other material found suitable for the purpose which is vulcanized to the faces of the outermost veneer plies of the assemblage as clearly shown in the several figures of the drawings.

In that form of the invention shown in Figure 1 the body of the wheel is of substantially uniform thickness throughout all portions of its area but in the form shown in Figure 2 the opposite side faces of the said body may be dished as indicated by the numeral 8 and given this shape by the method set forth in my said copending application.

In the form of the invention shown in Figure 3 a facing and reinforcing sheet 9 of rubber is preferably applied over the flanges 6 and over the bottom wall 3 of the channel 4, and a reinforcing medium such for example as a sheet 10 of wire mesh material may be embedded in the sheet 9 as clearly shown in the said figure.

Any of the several forms illustrated in the drawings, and any other form or shape falling within the scope of the present invention, may be equipped with standard wheel parts as illustrated for example in Figures 1 and 2 of the drawings and comprising the usual hub, brake parts, gears, etc.

Having thus described the invention what is claimed as new is:

1. A vehicle wheel comprising a body and tire seating rim constituting an integral structure and made up of plies of veneer and intervening bonding plies of rubber material.

2. A vehicle wheel comprising a body made up of intermediate and side plies of veneer bonded together, the peripheral portions of the side plies projecting beyond the peripheries of the intermediate plies to provide a tire seating channel surrounding the body.

3. A vehicle wheel comprising a body made up of intermediate and side plies of veneer bonded together, the peripheral portions of the side plies projecting beyond the peripheries of the intermediate plies to provide a tire seating channel surrounding the body, the said projecting portions of the side plies being permanently shaped to turn inwardly toward each other to adapt the same to engage a tire.

4. A vehicle wheel comprising a body and a tire seating rim constituting an integral structure, the body and rim comprising veneer plies and intervening bonding plies of rubber material, and a facing of rubber material extending over the surfaces of the body and rim.

5. A vehicle wheel comprising a body and a tire seating rim constituting an integral structure, the said body and rim comprising veneer plies and bonding plies of rubber material, and a rubber reinforcing and facing ply extending over the surfaces of the rim and having a foraminous reinforcing medium embedded therein.

6. A vehicle wheel comprising a body made up of intermediate and side plies bonded together by resilient material, certain of said plies projecting beyond the others to provide a tire seating channel surrounding the body.

7. A vehicle wheel comprising a body made up of intermediate and side plies bonded together by rubber material, certain of said plies projecting beyond the others to provide a tire seating channel surrounding the body.

In testimony whereof I affix my signature.

HARRY N. ATWOOD. [L. S.]